Patented Sept. 5, 1944

2,357,431

UNITED STATES PATENT OFFICE 2,357,431

REFRIGERATION

Thomas K. Sherwood, Cambridge, Mass., assignor to Servel, Inc., New York, N. Y., a corporation of Delaware No Drawing. Application February 24, 1941, Serial No. 380,305

7 Claims. (Cl. 252—69)

The invention relates to refrigeration in accordance with the absorption refrigerating principle. More particularly, it pertains to a working fluid or medium for an absorption refrigeration system, and includes correlated improvements and discoveries whereby the operation of such a system is facilitated.

Refrigeration in an absorption refrigeration system usually is occasioned by evaporation of a liquid refrigerant at a low pressure of the resulting vapor. This vapor is absorbed by a suitable absorbent from which it is subsequently liberated by heat at a somewhat higher pressure. Completion of the refrigerating cycle is brought about through condensation of the liberated vapors and evaporation again of the thus obtained refrigerant. Two types of absorption systems are employed. These are the continuous and the intermittent. In the former, as the designation implies, there is continuous operation involving evaporation of the refrigerant, absorption of the refrigerant vapor in an absorbent or solvent medium, liberation of the vapors from the solvent through heating, and condensation of the liberated vapors followed by re-evaporation occasioning cooling. Further, a continuous system may operate under a uniform pressure, or under a plurality of pressures, as the two-pressure system. In the intermittent procedure a given receptacle serves alternately to liberate refrigerant vapors and to absorb them. The liberation is effected by heat and the liberated vapors are condensed. This condensate is collected and evaporated with arising vapors being absorbed by the absorbent medium in the same receptacle through a cooling thereof. Thereby the absorbent takes up the refrigerant vapor which causes an evaporation of the liquid refrigerant at a low pressure with attending absorption of heat from the surroundings. The refrigerant, together with the absorbent material, are referred to as the working fluid and the absorbent may be either a solid or a liquid. However, only liquid absorbents may be readily adapted for use in a continuous manner.

Efficient and practical results in an absorption refrigerating machine are produced in the event that the working fluid includes an absorbent capable of liberating and absorbing a large amount of refrigerant per unit volume of absorbent. In order to accomplish this a solution of refrigerant in absorbent should give large negative deviation from Raoult's law, i. e., vapor pressures of refrigerant from solutions thereof in absorbent should be considerably lower than vapor pressures calculated through Raoult's law.

It is an object of the invention to provide a working fluid having as a refrigerant a compound that is non-toxic, non-inflammable and non-irritating.

A more particular object of the invention is the provision of a working fluid containing water as a refrigerant and an ethylene amino compound as an absorbent.

A further object of the invention is the provision of a practical working fluid for use in a refrigerating system adapted to condition or cool air through direct contact of the air with said system.

Another object of the invention is the provision of a process whereby water vapors are absorbed through contact with an absorbent medium containing an ethylene amino compound having a boiling point substantially above 100° C.

A specific object of the invention is the provision of a working fluid for an absorption refrigeration system including water as a refrigerant and an ethylene polyamine as an absorbent.

Other objects of the invention will in part be obvious and will in part appear hereinafter.

The invention accordingly comprises the several steps and the relation of one or more of such steps with respect to each of the others, and the working fluid possessing the features, properties, and the relation of constituents, which are exemplified in the following detailed disclosure, and the scope of the invention will be indicated in the claims.

In the practice of the invention there is provided a working fluid for an absorption refrigeration system containing an organic amine, especially an ethylene polyamine, which may contain a hydroxyl group, or an aqueous solution of such an amine as an absorbent, and water as refrigerant. It is advantageous that the amine have a boiling point substantially above that of water, i. e., normally above 100° C., and more especially that it shall have a boiling point above about 140° C. in order that water absorbed thereby may be readily removed by boiling. Moreover, it is desirable that the amine in relatively pure condition shall have a melting point which is not higher than about 10° C. Working fluids having satisfactory refrigerating characteristics may contain water as refrigerant and an ethylene amine, liquid at usual room temperatures, i. e., about 20° C., such as diethylene triamine, triethylene tetramine, tetraethylene pentamine, hydroxy ethyl ethylene diamine as an absorbent. Thus, such a refrigeration system may be charged with water as refrigerant and tetraethylene pentamine or hydroxy ethyl ethylene diamine, or diethylene triamine as absorbent.

A system in which such a working fluid may be utilized may comprise in combination a still in which a mixture of water and absorbent, as diethylene triamine, is heated to distill water away as a vapor, a rectifier in which absorption liquid vapor accompanying water vapor is condensed, a condenser wherein water vapor is changed to liquid, an evaporator in which the resulting liquid water is vaporized to produce refrigeration, and an absorber wherein water vapor containing added heat units taken up during the refrigerating process is dissolved in the diethylene triamine.

Additionally, the system may include suitable heat exchanging and circulating means and automatic controls. Usually in such a system the still operates at a temperature above normal room temperature, as at 210° to 250° F., and the cooling unit or evaporator at a temperature which is lower than normal, and may be from 15° to 50° F. Various parts of the system differ in the prevailing temperatures and pressures and both pressure and temperature determine the physical state of the water, i. e., whether it is gaseous or liquid, and also the solubility between the water and organic amine. It is of import that the absorbent and the refrigerant materials be physically adapted for use as individual materials in certain phases and for certain functions, and that they be mutually adapted for other functions when they are in combination. The working fluid herein described possesses these qualities, and hence is well adapted for utilization in an absorption refrigeration system.

The operation of an absorption refrigeration system utilizing water as a refrigerant and an organic amino compound having a boiling point substantially above 100° C., more particularly an ethylene polyamine, e. g., tetraethylene pentamine, entails the introduction of the water in liquid phase into the upper part of a cooling unit or evaporator wherein it evaporates with consequent absorption of heat from the surroundings to produce a refrigerating effect. This refrigerating effect is employed to cool the objects or the materials that are in contact with or in proximity to the cooling unit. The resulting water vapor flows from the cooling unit to an absorber in which it is absorbed by an organic amino compound, as those above mentioned. Thence the absorption liquid containing absorbed water is conducted to a still or generator which is heated, and the water vapor distilled from the absorption solution is again liquefied in a condenser and then reintroduced into the cooling unit to complete the refrigerating cycle. Following removal of water the absorbent passes from the generator to the absorber in order again to absorb water vapor.

As an illustrative embodiment of a manner in which the working fluids of the invention may be employed in an absorption refrigeration system, the following examples are presented:

Example 1

An absorption refrigeration unit was charged with tetraethylene pentamine as absorbent and water as refrigerant. Operation of the unit was in accordance with the procedure above described as to generator, condenser, evaporator and absorber, with the following results, it being noted that the cooling water passes successively through the absorber and condenser. The temperature of the cooling water before entering the absorber was 80° F. and upon leaving the condenser 91.5° F. The average temperature of the air entering the cooling unit was 92.5° F., whereas that of the air upon leaving the unit was 77.5° F. The pressure in the absorber was about 16.5 mm. of mercury and the resultant cooling effect was about 5400 Btu. per hour.

Example 2

An absorption refrigeration system was charged with a working fluid containing hydroxy ethyl ethylene diamine as absorbent and water as refrigerant in the proportion of about 9.5% of water. The system was operated in accordance with usual procedure and effectiveness of the working fluid was evidenced by the following data. The temperature of the cooling water upon entering the absorber was about 79° F., and upon leaving the condenser about 92° F. The average temperature of the air upon entering the cooling unit was about 84.5° F. and upon leaving the unit the air temperature was 69.8° F. Absorber pressure was about 9 mm. of mercury. Moreover, the working fluid gave an evaporator temperature of 49.5° F. and the cooling effect was about 5100 Btu. per hour.

Example 3

An absorption refrigerating system was charged with a working fluid containing diethylene triamine as absorbent and water as refrigerant, the water being present in an amount of about 28%. Due to a small amount of the triamine appearing in the evaporator inlet and overflow a rectifier was included in the system, and the following results were obtained. The temperature of the cooling water entering the absorber was about 73° F. and at the outlet of the condenser the temperature was about 93.6° F. Air entering the cooling unit had a temperature of about 87.5° F. whereas that leaving the unit was at a temperature of about 63.2° F. The pressure in the absorber was about 10 mm. of mercury, and the temperature in the evaporator was about 52° F. Further, the evaporator overflow temperature was about 56.5° F. and the cooling effect obtained with the diethylene triamine-water working fluid amounted to about 5800 Btu. per hour.

Example 4

An absorption refrigeration system was charged with a working fluid containing diethylene triamine as absorbent and water as refrigerant, the water being present in an amount of about 19%. The following data illustrate the results obtained with the use of this working fluid. The temperature of the cooling water entering the absorber was 80.5° F. and upon leaving the condenser 97.5° F. Air entering the cooling unit had a temperature of 77.4° F. and after contacting therewith the temperature at the outlet was 68.4° F. The pressure within the absorber was about 7.3 mm. of mercury. The temperature within the evaporator was about 43.5° F. and that at the evaporator overflow was 59.5° F. Utilization of this working fluid produced a cooling effect amounting to about 4600 Btu. per hour.

The foregoing examples and description have dealt with the invention illustratively in connection with an absorption refrigeration system of the two-fluid type. It will be realized that the working fluids disclosed may be employed also in a three-fluid system in which the two component working fluid combination is supplemented by a third and gaseous fluid, as hydrogen, said third fluid being inert with respect to the other working components. It is desired to mention also that the absorbent, i. e., the ethylene amino compound, may be employed for purposes other than in the production of cold. Thus, the ethylene polyamines may be utilized as a medium for the absorption of water vapor from gases and vapors containing the same without subsequently using the resulting solution for the production of cold.

Since certain changes in carrying out the above process, and certain modifications in the working fluid which embody the invention may be made without departing from its scope it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An absorption refrigeration system employing water as refrigerant and an ethylene amino compound having a boiling point above 100° C. as absorbent.

2. An absorption refrigeration system employing water as refrigerant and, as absorbent, a compound from the group consisting of tetraethylene pentamine, hydroxyethyl ethylene diamine, diethylene triamine, and triethylene tetramine.

3. A working fluid for an absorption refrigerating system, which comprises water as a refrigerant and a normally liquid aliphatic polyamine having a boiling point above approximately 100° C. as absorbent.

4. A working fluid for an absorption refrigerating system, which comprises water as the refrigerant and an absorbent having a boiling point above approximately 100° C. and comprising a compound having the formula $$NH_2(CH_2CH_2NH)nCH_2CH_2NH_2$$

where $n$ is a small whole number.

5. The working fluid of claim 4 where said absorbent comprises triethylene tetramine.

6. In an absorption refrigerating process wherein water as the refrigerant is alternately absorbed in and expelled from an absorbent, the step which includes absorbing the water in a normally liquid aliphatic polyamine having a boiling point above approximately 100° C.

7. In an absorption refrigerating process wherein water as the refrigerant is alternately absorbed in and expelled from an absorbent, the step which includes absorbing said refrigerant in an absorbent having a boiling point above approximately 100° C. and having a formula $$NH_2(CH_2CH_2NH)nCH_2CH_2NH_2$$

where $n$ is a small whole number.

THOMAS K. SHERWOOD.